United States Patent [19]
Perriello

[11] Patent Number: 6,110,372
[45] Date of Patent: *Aug. 29, 2000

[54] BIOREMEDIATION OF PETROLEUM POLLUTANTS WITH ALKANE-UTILIZING BACTERIA

[76] Inventor: Felix Anthony Perriello, 608 Normandy Dr., Norwood, Mass. 02062

[ * ] Notice: This patent is subject to a terminal disclaimer.

[21] Appl. No.: 09/275,381

[22] Filed: Mar. 24, 1999

Related U.S. Application Data

[63] Continuation of application No. 08/767,750, Dec. 17, 1996, Pat. No. 5,888,396.

[51] Int. Cl.$^7$ .................................................... C02F 3/34
[52] U.S. Cl. .................... 210/611; 210/620; 210/908; 210/909; 210/747; 435/262; 435/262.5
[58] Field of Search .................................... 210/610, 611, 210/620, 908, 909, 264, 747; 435/262, 262.5

[56] References Cited

U.S. PATENT DOCUMENTS

| | | | |
|---|---|---|---|
| 4,713,343 | 12/1987 | Wilson, Jr. et al. | 435/264 |
| 5,037,551 | 8/1991 | Barkley et al. | 210/603 |
| 5,057,221 | 10/1991 | Bryant et al. | 210/610 |
| 5,316,940 | 5/1994 | Georgiou et al. | 435/252.1 |
| 5,326,703 | 7/1994 | Hazen et al. | 435/262.5 |
| 5,342,769 | 8/1994 | Hunter et al. | 435/166 |
| 5,384,048 | 1/1995 | Hazen et al. | 210/605 |
| 5,441,887 | 8/1995 | Hanson et al. | 435/262.5 |
| 5,814,514 | 9/1998 | Steffan et al. | 435/262 |

OTHER PUBLICATIONS

Broholm et al., "Toxicity of 1,1,1–Trichloroethane and Trichlorethene on a Mixed Culture of Methane–Oxidizing Bacteria", *Applied and Environmental Microbiology*, vol. 56, No. 8, pp. 2488–2493 (Aug. 1990).

Wilson et al., Biotransformation of Trichloroethylene in Soil, *Applied and Environmental Microbiology*, vol. 49, No. 1, pp. 242–243 (Jan. 1985).

Nelson et al., Aerobic Metabolism of Trichloroethylene by a Bacterial Isolate, *Applied and Environmental Microbiology*, vol. 52, pp. 383–384 (Aug. 1986).

Little et al., Trichloroethylene Biodegradation by a Methane–Oxidizing Bacterium, *Applied and Environmental Microbiology*, vol. 54, pp. 951–956 (Apr. 1988).

Oldenhuis et al., Degradation of Chlorinated Aliphatic Hydrocarbons by *Methylosinu trichosporium* OB3b Expressing Soluble Methane Monooxygenase, *Applied and Environmental Microbiology*, vol. 55, No. 11, pp. 2819–2826 (Nov. 1989).

Tsien et al., Biodegradation of Trichloroethylene by *Methylosinus trichosporium* OB3b, *Applied and Environmental Microbiology*, vol. 55, No. 12, pp. 3155–3161 (Dec. 1989).

Oldenhuis et al., Kinetics of Chlorinated Hydrocarbon Degradation of *Methylosinus trichosporium* OB3b and Toxicity of Trichloroethylene, *Applied and Environmental Microbiology*, vol. 57, No. 1, pp. 7–14 (Jan. 1991).

Henry et al., Influence of Endogenous and Exogenous Electron Donors and Trichloroethylene Oxidation Toxicity on Trichloroethylene Oxidation by Methanotrophic Cultures from a Groundwater Aquifer, *Applied and Environmental Microbiology*, vol. 57, No. 1, pp. 236–244 (Jan. 1991).

Alvarez–Cohen et al., Product Toxicity and Cometabolic Competitive Inhibition Modeling of Chloroform and Trichloroethylene Transformation by Methanotrophic Resting Cells, *Applied and Environmental Microbiology*, vol. 57, No. 4, pp. 1031–1037 (Apr. 1991).

*Primary Examiner*—Christopher Upton
*Attorney, Agent, or Firm*—Alan G. Towner; Eckert Seamans Cherin & Mellott, LLC

[57] ABSTRACT

Alkane-utilizing bacteria are used to degrade pollutants comprising petroleum compounds. In-situ or ex-situ techniques may be used to reduce or eliminate petroleum pollutants from liquid, gas and solid sources. In a preferred embodiment, petroleum concentrations in various environments are reduced by contacting the petroleum pollutants with butane-utilizing bacteria in the presence of oxygen to degrade the petroleum pollutants by cometabolism or direct metabolism. Suitable alkane-utilizing bacteria include Pseudomonas, Variovorax, Nocardia, Chryseobacterium, Comamonas, Acidovorax, Rhodococcus, Aureobacterium, Micrococcus, Aeromonas, Stenotrophomonas, Sphingobacterium, Shewanella, Phyllobacterium, Clavibacter, Alcaligenes, Gordona, Corynebacterium and Cytophaga.

63 Claims, No Drawings

BIOREMEDIATION OF PETROLEUM POLLUTANTS WITH ALKANE-UTILIZING BACTERIA

CROSS-REFERENCE TO RELATED APPLICATION

This application is a continuation-in-part of U.S. patent application Ser. No. 08/767,750 filed Dec. 17, 1996, now U.S. Pat. No. 5,888,396, which is incorporated herein by reference.

FIELD OF THE INVENTION

The present invention relates to the degradation of pollutants, and more particularly relates to bioremediation of petroleum-based pollutants using alkane-utilizing microorganisms.

BACKGROUND INFORMATION

Gasoline and petroleum contaminated soil and groundwater are remediated using conventional technologies such as soil vapor extraction (SVE) with air-sparging (AS) enhancements. Gasoline and petroleum (e.g., hydraulic, motor and fuel oils) are highly degradable in the subsurface environment if the proper conditions are maintained for a significant portion of the remediation effort. For example, aerobic degradation of gasoline and petroleum compounds is accelerated if oxygen in sufficient concentration is present in the release area.

Conventional technologies such as SVE provide the necessary oxygen supply by creating a vacuum in the soil which is constantly replenished with fresh air, or by air sparging with pulses air into the subsurface using compressors. Some remediation specialists have even used chemicals such as hydrogen peroxide and slow release oxygen compounds to oxygenate gasoline and fuel oil spills to accelerate cleanup. With an adequate oxygen supply present, indigenous bacteria well-acclimated to the site conditions are able to metabolize the pollutants over time.

Many petroleum spills such as gasoline and fuel oils spread out into the soil creating adsorbed-phase contamination. The plume continues to migrate downward until it reaches the groundwater where it will float. Pure petroleum product then pools on the groundwater as a separate-phase and additional soluble compounds of the petroleum mix create dissolved-phase contamination. Over time, the indigenous petroleum-degrading microorganisms metabolize the carbon source. The volatile components of the petroleum mix are usually the first to be degraded. The higher chain petroleum constituents (long chain aliphatic hydrocarbons and polycyclic aromatic hydrocarbons) remain in the subsurface for a longer period of time and are typically seen as the weathered components of an old oil or gasoline spill.

The degradation of benzene rings by aerobic bacteria has been demonstrated for a variety of bacterial groups and classes. However, remediation specialists have not injected petroleum-derived compounds into a petroleum-based release site since the carbon source for bacterial metabolism is already present, and the addition of a second petroleum-based compound has not conventionally been considered to accelerate site cleanup and restoration.

Despite conventional remediation efforts, a need still exists for the effective degradation of petroleum pollutants. The present invention has been developed in view of the foregoing, and to remedy other deficiencies of the prior art.

SUMMARY OF THE INVENTION

In accordance with the present invention, alkane-utilizing organisms are used to degrade petroleum pollutants. Degradation may occur cometabolically or by direct metabolism. The alkane-utilizing organisms of the present invention may be used for in-situ or ex-situ bioremediation of petroleum contaminants contained in air, soil and groundwater waste streams. In addition, salt- and acid-tolerant alkane-utilizing bacteria may be used to restore saline and low pH groundwater systems impacted by petroleum contamination. The metabolism of petroleum compounds is preferably enhanced through oxygenase catalyzed reactions.

An aspect of the present invention is to provide an improved method of degrading petroleum pollutants.

Another aspect of the present invention is to provide a method of degrading petroleum pollutants with alkane-utilizing bacteria by a cometabolic process.

Another aspect of the present invention is to provide a method of degrading petroleum pollutants with alkane-utilizing bacteria capable of directly metabolizing the petroleum pollutants.

Another aspect of the present invention is to provide a method of degrading a petroleum pollutant by treating the pollutant with alkane-utilizing bacteria in the presence of at least one alkane and oxygen for a sufficient time for the alkane-utilizing bacteria to degrade the petroleum pollutant.

Another aspect of the present invention is to provide a method of decontaminating water. The method includes the steps of providing contaminated water comprising a petroleum pollutant, and treating the petroleum pollutant with an alkane-utilizing bacteria in the presence of at least one alkane and oxygen for a treatment time sufficient for the alkane-utilizing bacteria to degrade the petroleum pollutant to produce decontaminated water having a lower concentration of the petroleum pollutant than the contaminated water.

Another aspect of the present invention is to provide a method of treating a site contaminated with petroleum pollutants. The method includes the steps of supplying an alkane substrate to the contaminated site, and supplying an oxygen-containing gas to the contaminated site.

These and other aspects of the present invention will become more apparent from the following description.

DETAILED DESCRIPTION OF THE PREFERRED EMBODIMENTS

The present invention relates to methods for the degradation of petroleum pollutants. As used herein, the term "petroleum pollutants" includes compounds contained in crude or refined petroleum. Such petroleum-derived compounds typically include combinations of aliphatics (e.g., C5–C36) and aromatics (e.g., C9–C22). Specific petroleum pollutants include crude oil, refined oil, fuel oils (e.g., Nos. 2, 4 and 6 fuel oils), diesel oils, gasoline, hydraulic oils and kerosene. Benzene, toluene, ethylbenzene and xylenes (BTEX) are the most volatile constituents of gasoline and may be present in the petroleum pollutants. Trimethylbenzenes, and other PAHs such as naphthalene, anthracene, acenaphthene, acenaphthylene, benzo (a) anthracene, benzo (a) pyrene, benzo (b) fluoranthene, benzo (g,h,i) perylene, benzo (k) fluoranthene and pyrene, are also common constituents of fuel oils and heavier petroleum compounds. The amount of petroleum pollutants contained in a contaminated site, for example in soil or groundwater, may be quantified as total petroleum hydrocarbons (TPH). In addition, the petroleum pollutants may be quantified as individual groups of aliphatic and aromatic compounds.

Such petroleum pollutants may also be accompanied by other pollutants such as chlorinated aliphatics, chlorinated aromatics and non-chlorinated aromatics. Specific hydrocarbon pollutants include methylene chloride, 1,1-dichloroethane, chloroform, 1,2-dichloropropane, dibromochloromethane, 1,1,2-trichloroethane, 2-chloroethylvinyl ether, tetrachloroethene (PCE), chlorobenzene, 1,2-dichloroethane, 1,1,1-trichloroethane, bromodichloromethane, trans-1,3-dichloropropene, cis-1,3-dichloropropene, bromoform, chloromethane, bromomethane, vinyl chloride, chloroethane, 1,1-dichloroethene, trans-1,2-dichloroethene, trichloroethene (TCE), dichlorobenzenes, cis-1,2-dichloroethene, dibromomethane, 1,4-dichlorobutane, 1,2,3-trichloropropane, bromochloromethane, 2,2-dichloropropane, 1,2-dibromoethane, 1,3-dichloropropane, bromobenzene, chlorotoluenes, trichlorobenzenes, trans-1, 4-dichloro-2-butene and butylbenzenes.

In accordance with the present invention, alkanes are used to stimulate the growth of alkane-utilizing bacteria which are effective in degrading petroleum pollutants. Suitable alkanes include methane, ethane, propane, butane and mixtures thereof. For example, natural gas may be used as the alkane source. Butane is a particularly preferred alkane for use in accordance with the present invention. The butane may be provided in the form of a butane substrate. The butane substrate includes liquids and/or gases in which butane is present in sufficient amounts to stimulate substantial growth of butane-utilizing bacteria. Butane is preferably the most prevalent compound of the butane substrate, on a weight percent basis. Butane typically comprises at least about 10 weight percent of the butane substrate. The other constituents of the butane substrate may include any suitable compounds, including inert gases and/or other alkanes such as methane, ethane and propane. Preferably, the butane substrate comprises at least about 50 weight percent butane, more preferably at least about 90 weight percent butane. In a particular embodiment, the butane substrate comprises at least about 99 weight percent n-butane. While the use of a butane substrate is primarily described herein, it is to be understood that other alkanes and alkane-utilizing bacteria may be used in accordance with the present invention.

The oxygen may be supplied in any suitable form, including air, pure oxygen and blends of oxygen with inert gases such as helium, argon, nitrogen, carbon monoxide and the like.

The bioremediation process of the present invention may be performed either in-situ or ex-situ to remove contaminants from various environments including aqueous systems. Aqueous systems suitable for treatment include drinking water, groundwater, industrial waste water and the like.

According to an embodiment of the present invention, butane-utilizing bacteria are effective at degrading petroleum pollutants. The butane-utilizing bacteria may be used to aerobically degrade petroleum by cometabolism and/or direct metabolism processes.

Butane is a four carbon molecule and a component of long chain aliphatic hydrocarbons. Stimulation with butane gas results in a large treatment area. For example, if butane gas is injected at high concentrations into a petroleum release area, the biostimulation rapidly increases the number of petroleum-degrading microorganisms per gram of soil or milliliter of groundwater in the targeted area. The present method is particularly effective for more weathered petroleum release sites where the most volatile components have been long degraded and the effective petroleum release area has subsequently shrunken in size. If butane injection is stopped or interrupted and oxygen supply is continued in the treatment area, the high density of butane-utilizers will be forced to metabolize the remaining petroleum constituents in the soil since the butane food source has been removed. This accelerates petroleum cleanup by enhancing natural attenuation, and is an effective treatment for gasoline and fuel oil spills.

The butane-utilizing bacteria of the present invention preferably produce oxygenase enzymes and are capable of metabolizing butane. The operative enzymes may include extracellular enzymes, intracellular enzymes and cell-bound enzymes. The butane-utilizing bacteria typically produce butane monoxygenase and/or butane dioxygenase enzymes, and in some embodiments may also be capable of producing dehologenase enzymes which directly metabolize petroleum compounds;.

The butane-utilizing bacteria of the present invention may contain gram negative and gram positive aerobic rods and cocci, facultative anaerobic gram negative rods, non-photosynthetic, non-fruiting gliding bacteria and irregular non-sporing gram positive rods.

Of the Pseudomonadaceae family comprising gram-negative aerobic rods and cocci, species of the following genera may be suitable: Pseudomonas; Variovorax; Chryseobacterium; Comamonas; Acidovorax; Stenotrophomonas; Sphingobacterium; Xanthomonas; Frateuria; Zoogloea; Alcaligenes; Flavobacterium; Derxia; Lampropedia; Brucella; Xanthobacter; Thermus; Thermomicrobium; Halomonas; Alteromonas; Serpens; Janthinobacterium; Bordetella; Paracoccus; Beijerinckia; and Francisella.

Of the Nocardioform Actinomycetes family comprising gram-positive Eubacteria and Actinomycetes, the following genera may be suitable: Nocardia; Rhodococcus; Gordona; Nocardioides; Saccharopolyspora; Micropolyspora; Promicromonospora; Intrasporangium; Pseudonocardia; and Oerskovia.

Of the Micrococcaceae family comprising gram-positive cocci, the following genera may be suitable: Micrococcus; Stomatococcus; Planococcus; Staphylococcus; Aerococcus; Peptococcus; Peptostreptococcus; Coprococcus; Gemella; Pediococcus; Leuconostoc; Ruminococcus; Sarcina; and Streptococcus.

Of the Vibrionaceae family comprising facultative anaerobic gram-negative rods, the following genera may be suitable: Aeromonas; Photobacterium; Vibrio; Plesiomonas; Zymomonas; Chromobacterium; Cardiobacterium; Calymmatobacterium; Streptobacillus; Eikenella; and Gardnerella.

Of the Rhizobiaceae family comprising gram-negative aerobic rods and cocci, the following genera may be suitable: Phyllobacterium; Rhizobium; Bradyrhizobium; and Agrobacterium.

Of the Cytophagaceae family comprising non-photosynthetic, gliding bacteria, non-fruiting, the following genera may be suitable: Cytophaga; Flexibacter; Saprospira; Flexithrix; Herpetosiphon; Capnocytophaga; and Sporocytophaga.

Of the Corynebacterium family comprising irregular, non-sporing gram-positive rods, the following genera may be suitable: Aureobacterium; Agromyces; Arachnia; Rothia; Acetobacterium; Actinomyces; Arthrobactera; Arcanobacterium; Lachnospira; Propionibacterium; Eubacterium; Butyrivibria; Brevibacterium; Bifidobacterium; Microbacterium; Caseobacter; and Thernoanaerobacter.

The following isolation techniques were used for obtaining pure and mixed cultures of various methane-, propane- and butane-utilizing bacteria. Enrichment procedures were used to increase bacterial population for a given growth substrate. Soil samples collected from a variety of sites underwent enrichment transfers weekly for a period of one year. The methods and materials used for the enrichment studies are described below.

Soil samples were collected with a stainless-steel hand auger at depths that varied between one to two feet. The soils samples were stored in dedicated glass containers and moistened with sterile deionized/distilled water for transport to the laboratory. The hand auger was decontaminated between sampling locations with three Alconox soap/distilled water rinses. Soil samples used as inocula were collected from the locations summarized in Table 1.

TABLE 1

| Sample Number/Matrix | Sample Location |
| --- | --- |
| 1/soil | Landfill cell |
| 2/soil | #2 fuel oil impacted soil |
| 3/soil | Landfill cell |
| 4/soil | Gasoline and waste oil impacted soils |
| 5/soil | Shallow freshwater lagoon |
| 6/soil | Salt marsh |
| 7/soil | Industrial outfall |
| 8/soil | #2 fuel oil impacted soil |

Cultures were transferred weekly for a period of one year in liquid media to increase the relative numbers of methane-, propane- and butane-utilizing bacteria. The liquid media was a mineral salts media (MSM) prepared from the following chemicals:

| | |
| --- | --- |
| $MgSO_4$—$7H_2O$ | 1.0 g; |
| $CaCl_2$ | 0.2 g; |
| $NH_4Cl$ | 0.5 g; |
| $FeCl_3$—$6H_2O$ | 4.0 mg; |
| Trace elements solution | 0.5 ml; and |
| Distilled water | 900 ml. |

A trace elements solution, which provides micronutrients for bacterial growth, was prepared comprising the following ingredients:

| | |
| --- | --- |
| $ZnCl_2$ | 5.0 mg; |
| $MnCl_2$—$4H_2O$ | 3.0 mg; |
| $H_3BO_4$ | 30.0 mg; |
| $NiCl_2$—$6H_2O$ | 2.0 mg; |
| $(NH_4)_6Mo_7O_{24}$—$4H_2O$ | 2.25 mg; and |
| Distilled water | 1000 ml. |

The pH of the MSM was adjusted to 6.8 before autoclaving (20 min at 121 degree C.) with 20.0 ml of a phosphate buffer solution comprising 3.6 g of $Na_2HPO_4$ and 1.4 g of $KH_2PO_4$ in 100 ml of distilled water. After autoclaving the MSM and the buffer solution, another 2.0 ml of the buffer solution was added to the MSM when the temperature of the media reached 60 degree C. The MSM cocktail was completed with the addition of 4.0 mg of casamino acids and 4.0 mg of yeast (Difco) dissolved in 100 ml of distilled water. The nutrient solution was filter sterilized by vacuum filtration through a 0.2 micron filter (Gelman) prior to addition to the MSM.

Prior to the first enrichment transfer, the inocula from the eight sampling locations summarized in Table 1 underwent a series of pre-treatments. The first two pre-treatments were conducted on the original soil materials used as inocula. The last two treatments were applied as MSM alterations during the weekly transfers. The pre-treatments consisted of the following: (1) 30% ethanol saturation rinse followed by a sterile phosphate buffer rinse (ethanol); (2) 60° C. water bath for 15 minutes (heat); (3) no treatment (no-treat); (4) MSM containing 10% aqueous solution of sodium chloride (10% NaCl); and (5) MSM with pH of 2.0 (pH of 2). Treatment Nos. (4) and (5) were employed in an attempt to locate extreme halophiles and acidophiles capable of utilizing hydrocarbons as a growth substrate.

The first enrichment transfers for each sample series were conducted in 72 ml serum bottles (Wheaton) with 20 ml of MSM and 1.0 g of inocula. Subsequent culture transfers (5.0 ml) were conducted with sterilized plastic syringes (B&D). The bottles were capped with red rubber plugs and crimped with aluminum seals (Wheaton). Each sample was handled aseptically and all glassware, materials and supplies were sterilized by autoclaving. Table 2 summarizes the enrichment transfer schedule and the concentration of methane or propane replaced in the headspace of each serum bottle using a dedicated gas tight syringe (Hamilton) with a Fisher Scientific inert sampling valve (on/off lever) to control gas loss from the needle tip between each transfer.

TABLE 2

| Sample No. | Pre-Treatment | Food Source | Sample ID |
| --- | --- | --- | --- |
| 1 | ethanol | methane | 1EM |
| 1 | heat | methane | 1HM |
| 1 | no-treat | methane | 1NM |
| 1 | 10% NaCl | methane | 1SM |
| 1 | pH of 2.0 | methane | 1AM |
| 1 | ethanol | propane | 1EP |
| 1 | heat | propane | 1HP |
| 1 | no-treat | propane | 1NP |
| 1 | 10% NaCl | propane | 1SP |
| 1 | pH of 2.0 | propane | 1AP |

The amount of oxygen required for mineralization of methane, propane and butane can be derived from the following equations.

| | |
| --- | --- |
| $CH_4 + 2O_2 = CO_2 + 2H_2O$ | 2:1 |
| $C_3H_8 + 5O_2 = 3CO_2 + 4H_2O$ | 5:1 |
| $C_4H_{10} + 6.5O_2 = 4CO2 + 5H_2O$ | 6.5:1 |

Table 2 summarizes the entire set of enrichment transfers prepared for Sample No. 1. The first sample series did not include a butane treatment. The remaining seven samples were prepared in identical fashion and, in addition, contained a butane treatment series, as shown in Tables 3 through 9. A control (serum bottle with sterilized MSM only) was maintained for each sample series.

All hydrocarbon gases described herein were research grade quality (Scott Specialty Gases). Methane was added at a concentration of 27% (vol/vol), propane at 10% and butane at 6%. After the first six months of enrichment transfers, the concentrations were reduced to 13% for methane and 9% for propane. The concentration of butane remained the same at 6%.

TABLE 3

| Sample No. | Pre-Treatment | Food Source | Sample ID |
|---|---|---|---|
| 2 | ethanol | methane | 2EM |
| 2 | heat | methane | 2HM |
| 2 | no-treat | methane | 2NM |
| 2 | 10% NaCl | methane | 2SM |
| 2 | pH of 2.0 | methane | 2AM |
| 2 | ethanol | propane | 2EP |
| 2 | heat | propane | 2HP |
| 2 | no treat | propane | 2NP |
| 2 | 10% NaCl | propane | 2SP |
| 2 | pH of 2.0 | propane | 2AP |
| 2 | ethanol | butane | 2EB |
| 2 | heat | butane | 2HB |
| 2 | no-treat | butane | 2NB |
| 2 | 10% NaCl | butane | 2SB |
| 2 | pH of 2.0 | butane | 2AB |

TABLE 4

| Sample No. | Pre-Treatment | Food Source | Sample ID |
|---|---|---|---|
| 3 | ethanol | methane | 3EM |
| 3 | heat | methane | 3HM |
| 3 | no-treat | methane | 3NM |
| 3 | 10% NaCl | methane | 3SM |
| 3 | pH of 2.0 | methane | 3AM |
| 3 | ethanol | propane | 3EP |
| 3 | heat | propane | 3HP |
| 3 | no-treat | propane | 3NP |
| 3 | 10% NaCl | propane | 3SP |
| 3 | pH of 2.0 | propane | 3AP |
| 3 | ethanol | butane | 3EB |
| 3 | heat | butane | 3HB |
| 3 | no-treat | butane | 3NB |
| 3 | 10% NaCl | butane | 3SB |
| 3 | pH of 2.0 | butane | 3AB |

TABLE 5

| Sample No. | Pre-Treatment | Food Source | Sample ID |
|---|---|---|---|
| 4 | ethanol | methane | 4EM |
| 4 | heat | methane | 4HM |
| 4 | no-treat | methane | 4NM |
| 4 | 10% NaCl | methane | 4SM |
| 4 | pH of 2.0 | methane | 4AM |
| 4 | ethanol | propane | 4EP |
| 4 | heat | propane | 4HP |
| 4 | no-treat | propane | 4NP |
| 4 | 10% NaCl | propane | 4SP |
| 4 | pH of 2.0 | propane | 4AP |
| 4 | ethanol | butane | 4EB |
| 4 | heat | butane | 4HB |
| 4 | no-treat | butane | 4NB |
| 4 | 10% NaCl | butane | 4SB |
| 4 | pH of 2.0 | butane | 4AB |

TABLE 6

| Sample No. | Pre-Treatment | Food Source | Sample ID |
|---|---|---|---|
| 5 | ethanol | methane | 5EM |
| 5 | heat | methane | 5HM |
| 5 | no-treat | methane | 5NM |
| 5 | 10% NaCl | methane | 5SM |
| 5 | pH of 2.0 | methane | 5AM |
| 5 | ethanol | propane | 5EP |
| 5 | heat | propane | 5HP |
| 5 | no-treat | propane | 5NP |
| 5 | 10% NaCl | propane | 5SP |
| 5 | pH of 2.0 | propane | 5AP |

TABLE 6-continued

| Sample No. | Pre-Treatment | Food Source | Sample ID |
|---|---|---|---|
| 5 | ethanol | butane | 5EB |
| 5 | heat | butane | 5HB |
| 5 | no-treat | butane | 5NB |
| 5 | 10% NaCl | butane | 5SB |
| 5 | pH of 2.0 | butane | 5AB |

TABLE 7

| Sample No. | Pre-Treatment | Food Source | Sample ID |
|---|---|---|---|
| 6 | ethanol | methane | 6EM |
| 6 | heat | methane | 6HM |
| 6 | no-treat | methane | 6NM |
| 6 | 10% NaCl | methane | 6SM |
| 6 | pH of 2.0 | methane | 6AM |
| 6 | ethanol | propane | 6EP |
| 6 | heat | propane | 6HP |
| 6 | no-treat | propane | 6NP |
| 6 | 10% NaCl | propane | 6SP |
| 6 | pH of 2.0 | propane | 6AP |
| 6 | ethanol | butane | 6EB |
| 6 | heat | butane | 6HB |
| 6 | no-treat | butane | 6NB |
| 6 | 10% NaCl | butane | 6SB |
| 6 | pH of 2.0 | butane | 6AB |

TABLE 8

| Sample No. | Pre-Treatment | Food Source | Sample ID |
|---|---|---|---|
| 7 | ethanol | methane | 7EM |
| 7 | heat | methane | 7HM |
| 7 | no-treat | methane | 7NM |
| 7 | 10% NaCl | methane | 7SM |
| 7 | pH of 2.0 | methane | 7AM |
| 7 | ethanol | propane | 7EP |
| 7 | heat | propane | 7HP |
| 7 | no-treat | propane | 7NP |
| 7 | 10% NaCl | propane | 7SP |
| 7 | pH of 2.0 | propane | 7AP |
| 7 | ethanol | butane | 7EB |
| 7 | heat | butane | 7HB |
| 7 | no-treat | butane | 7NB |
| 7 | 10% NaCl | butane | 7SB |
| 7 | pH of 2.0 | butane | 7AB |

TABLE 9

| Sample No. | Pre-Treatment | Food Source | Sample ID |
|---|---|---|---|
| 8 | ethanol | methane | 8EM |
| 8 | heat | methane | 8HM |
| 8 | no-treat | methane | 8NM |
| 8 | 10% NaCl | methane | 8SM |
| 8 | pH of 2.0 | methane | 8AM |
| 8 | ethanol | propane | 8EP |
| 8 | heat | propane | 8HP |
| 8 | no-treat | propane | 8NP |
| 8 | 10% NaCl | propane | 8SP |
| 8 | pH of 2.0 | propane | 8AP |
| 8 | ethanol | butane | 8EB |
| 8 | heat | butane | 8HB |
| 8 | no-treat | butane | 8NB |
| 8 | 10% NaCl | butane | 8SB |
| 8 | pH of 2.0 | butane | 8AB |

After the first two weeks of enrichment transfers, all liquid suspensions, with the exception of the 10% NaCl treatments, the 2.0 pH treatments and the controls, demonstrated a significant increase in turbidity.

After conducting the enrichment transfers for 25 weeks, morphological descriptions and direct cell counts were compiled for all isolates. Morphological descriptions of the isolates were compiled using an Olympus BH-2 Phase Contrast Microscope. In addition, a Bright Line Hemacytometer (Fisher Scientific) was used to enumerate cell densities by the direct count method. Table 10 summarizes the descriptions and cell density enumerations. Serum bottles of sterilized MSM were maintained as controls.

TABLE 10

| Sample ID | Morphology | Enumeration (cells/ml) |
|---|---|---|
| 1EM | cocci | 2.5E8 |
| 1HM | cocci/bacilli | 1.8E8 |
| 1NM | bacilli | 1.3E8 |
| 1SM | cocci | 5.8E6 |
| 1AM | cocci | 3.8E6 |
| 1EP | bacilli | 4.0E6 |
| 1HP | cocci | 1.3E7 |
| 1NP | bacilli | 9.8E6 |
| 1SP | diplococci | 4.0E6 |
| 1AP | bacilli (variable) | 1.5E6 |
| 2EM | cocci/bacilli | 1.2E8 |
| 2HM | cocci/bacilli | 7.3E7 |
| 2NM | streptococci/bacilli | 1.1E8 |
| 2SM | comma-shaped | 6.6E7 |
| 2AM | comma-shaped | 8.3E6 |
| 2EP | bacilli | 1.2E8 |
| 2HP | bacilli/comma-shaped | 1.8E8 |
| 2NP | bacilli (variable) | 1.1E8 |
| 2SP | cocci | 7.0E6 |
| 2AP | cocci | 3.3E6 |
| 2EB | cocci/bacilli | 2.1E8 |
| 2HB | bacilli (variable) | 2.5E8 |
| 2NB | cocci/comma-shaped | 1.9E8 |
| 2SB | bacilli | 2.5E6 |
| 2AB | cocci | 3.0E6 |
| 3EM | cocci/bacilli | 1.4E8 |
| 3HM | cocci | 1.2E8 |
| 3NM | cocci | 5.8E7 |
| 3SM | cocci | 7.5E5 |
| 3AM | cocci | 7.5E5 |
| 3EP | bacilli | 7.8E7 |
| 3HP | bacilli | 3.0E7 |
| 3NP | bacilli | 7.1E7 |
| 3SP | cocci | 1.0E6 |
| 3AP | bacilli | 2.5E5 |
| 3EB | bacilli (variable) | 1.5E8 |
| 3HB | cocci/bacilli | 3.1E7 |
| 3NB | cocci | 3.1E8 |
| 3SB | cocci (irregular) | 1.7E7 |
| 3AB | cocci/bacilli | 2.5E5 |
| 4EM | cocci (variable) | 1.6E8 |
| 4HM | diplococci | 3.1E8 |
| 4NM | cocci | 1.6E8 |
| 4SM | cocci | 1.3E6 |
| 4AM | bacilli | 2.5E5 |
| 4EP | bacilli (variable) | 1.0E8 |
| 4HP | bacilli (variable) | 2.2E8 |
| 4NP | cocci | 1.3E8 |
| 4SP | cocci | 1.5E6 |
| 4AP | cocci/bacilli | 6.5E6 |
| 4EB | bacilli | 3.6E8 |
| 4HB | bacilli (variable) | 4.8E8 |
| 4NB | bacilli | 2.6E8 |
| 4SB | comma-shaped | 1.3E6 |
| 4AB | cocci | 1.0E6 |
| 5EM | cocci (variable) | 1.3E8 |
| 5HM | cocci | 1.4E8 |
| 5NM | cocci | 2.4E8 |
| 5SM | no cells | 0.0 |
| 5AM | no cells | 0.0 |
| 5EP | cocci (variable) | 5.1E7 |
| 5HP | bacilli | 3.2E7 |
| 5NP | streptococci | 2.1E8 |
| 5SP | cocci (variable) | 2.8E6 |
| 5AP | bacilli | 5.0E5 |
| 5EB | bacilli | 3.1E8 |
| 5HB | cocci | 3.2E7 |
| 5NB | cocci | 1.6E8 |
| 5SB | bacilli | 1.0E6 |
| 5AB | cocci | 2.5E6 |
| 6EM | bacilli (variable) | 1.7E8 |
| 6HM | cocci | 2.6E8 |
| 6NM | cocci/spirochetes | 1.3E8 |
| 6SM | cocci (variable) | 1.3E6 |
| 6AM | cocci (variable) | 2.0E6 |
| 6EP | bacilli | 2.8E7 |
| 6HP | bacilli | 1.3E8 |
| 6NP | bacilli/spirochetes | 2.0E8 |
| 6SP | cocci (variable) | 3.5E6 |
| 6AP | cocci (variable) | 5.0E5 |
| 6EB | cocci | 3.5E7 |
| 6HB | bacilli | 1.3E8 |
| 6NB | bacilli | 4.8E7 |
| 6SB | cocci | 2.3E6 |
| 6AB | cocci | 3.3E6 |
| 7EM | streptococci | 1.3E8 |
| 7HM | staphylococci | 3.2E7 |
| 7NM | cocci/bacilli | 3.1E8 |
| 7SM | cocci (variable) | 3.0E6 |
| 7AM | cocci (variable) | 4.0E6 |
| 7EP | bacilli | 1.4E8 |
| 7HP | bacilli | 4.1E8 |
| 7NP | bacilli | 3.5E8 |
| 7SP | cocci (variable) | 1.2E7 |
| 7AP | cocci (variable) | 1.5E6 |
| 7EB | bacilli (variable) | 1.6E8 |
| 7HB | bacilli (variable) | 3.9E8 |
| 7NB | bacilli | 4.2E8 |
| 7SB | cocci (variable) | 4.3E6 |
| 7AB | cocci (variable) | 2.8E6 |
| 8EM | cocci | 5.6E7 |
| 8HM | cocci | 6.1E7 |
| 8NM | cocci | 5.7E7 |
| 8SM | cocci (variable) | 5.3E6 |
| 8AM | bacilli | 2.3E6 |
| 8EP | bacilli | 1.4E8 |
| 8HP | cocci | 3.8E8 |
| 8NP | cocci | 2.9E8 |
| 8SP | square-shaped | 6.5E6 |
| 8AP | cocci (variable) | 3.8E6 |
| 8EB | bacilli | 1.3E8 |
| 8HB | bacilli/streptococci | 9.8E7 |
| 8NB | bacilli (variable) | 1.2E8 |
| 8SB | bacilli (variable) | 2.0E6 |
| 8AB | cocci (variable) | 2.8E6 |
| Control-1 | no cells | 0.0 |
| Control-2 | no cells | 0.0 |
| Control-3 | no cells | 0.0 |

Sample ID strains 3NB and 6NB were placed on deposit with the American Type Culture Collection (ATCC), Rockville, Md. on Aug. 22, 1996, under ATCC designation numbers 55808 and 55809, respectively.

After treatment in accordance with the present invention, petroleum pollutant levels are reduced significantly. For example, in contaminated groundwater and soil, the levels of petroleum pollutants are preferably reduced to levels below those listed in Table 11.

TABLE 11

| Constituent | Groundwater (ppm) | Soil (ppm) |
|---|---|---|
| TPH | 0.2 | 200 |
| Aliphatics C5–C8 | 0.4 | 100 |
| Aliphatics C9–C12 | 4 | 1,000 |

TABLE 11-continued

| Constituent | Groundwater (ppm) | Soil (ppm) |
|---|---|---|
| Aliphatics C9–C18 | 4 | 1,000 |
| Aliphatics C19–C36 | 5 | 2,500 |
| Aromatics C9–C10 | 0.2 | 100 |
| Aromatics C11–C22 | 0.2 | 200 |

As a food source for microbial consumption, butane may be a superior substrate to methane or propane in many applications due to its solubility factor. Methane and propane are characterized as slightly soluble in water, while butane is characterized as very soluble in water. At 17 degrees centigrade, 3.5 ml of methane and 6.5 ml of propane dissolves in 100 ml of water. In contrast, 15 ml of butane dissolves in 100 ml of water. Higher solubility increases microbial access to the growth substrate for metabolism, and may produce reaction rates demonstrating first order kinetics.

Various propane-utilizing and butane-utilizing bacteria were characterized as follows. Microorganism identification is based on the Similarity Index. The Similarity Index in the Microbial Identification System (MIS) is a numerical value which expresses how closely the fatty acid composition of an unknown sample compares with the mean fatty acid methyl ester composition of the strains used to create the library entry listed as its match. The database search presents the best matches and associated similarity indices. An exact match of the fatty acid make-up of the unknown sample to the mean of a library entry results in a similarity index of 1.000. The similarity index will decrease as each fatty acid varies from the mean percentage. Strains with a similarity of 0.500 or higher and with a separation of 0.100 between first and second choice are good matches (good or excellent). A similarity index between 0.300 and 0.500 may be a good match but would indicate an atypical strain (OK). Values lower than 0.300 suggest that the species is not in the database but those listed provide the most closely related species (weak or poor).

In the cases where a strain remained unidentified after fatty acid analysis, the Biolog system was employed where microorganisms are identified by comparing substrate utilization characteristics of the unknown isolate to the Biolog database.

The following isolates were chosen for identification at two independent laboratories: propane-utilizers 2EP, 3EP, 4HP, 6HP, 6NP and 8NP; and butane-utilizers 2EB, 2HB, 3EB, 3NB, 4EB, 4HB, 4NB, 5EB, 6HB, 6NB and 7NB.

The majority of the propane-utilizers and butane-utilizers were characterized as different genera/species by both laboratories for the comparison-pair isolates 2EP-2EB, 3EP-3EB, 4HP-4HB, 6HP-6HB, and 6NP-6NB, thus indicating that the butane-utilizers are a distinct class of microorganism from the propane degraders. Since methane-utilizing bacteria are obligate methane oxidizers, no isolates from the methane microcosms were submitted for laboratory analysis. Most isolates from the microcosms were mixed. Between both laboratories, 59 genus/specie were identified with "good or excellent" precision, 14 with "OK" precision (atypical strains) and 22 with "weak" precision (species not in database and remain as unknowns). A summary of the butane-utilizers that may have the ability to degrade petroleum compounds are identified in Table 12.

TABLE 12

| Sample ID | Genus | Species |
|---|---|---|
| 2HB* | Pseudomonas | putida |
| 2EB | Pseudomonas | rubrisubalbicans |
| 3EB | Pseudomonas | rubrisubalbicans |
| 5EB | Pseudomonas | aeruginosa |
| 6NB | Pseudomonas | aeruginosa |
| 2EB | Variovorax | paradoxus |
| 2HB | Variovorax | paradoxus |
| 3EB | Variovorax | paradoxus |
| 3NB | Variovorax | paradoxus |
| 4HB | Variovorax | paradoxus |
| 4NB | Variovorax | paradoxus |
| 5EB* | Variovorax | paradoxus |
| 6HB | Variovorax | paradoxus |
| 2EB | Variovorax | paradoxus** |
| 6NB | Variovorax | paradoxus*** |
| 7NB | Nocardia | asteroides |
| 2HB | Nocardia | asteroides*** |
| 3EB | Nocardia | asteroides*** |
| 4HB* | Nocardia | asteroides*** |
| 4NB | Nocardia | asteroides*** |
| 7NB | Nocardia | asteroides*** |
| 5EB* | Nocardia | brasiliensis |
| 2EB | Nocardia | restricta |
| 2HB | Nocardia | globerula |
| 2HB | Chryseobacterium | indologenes |
| 4HB | Chryseobacterium | indologenes |
| 7NB | Chryseobacterium | indologenes |
| 5EB | Chryseobacterium | meningosepticum |
| 2EB | Comamonas | acidovorans |
| 3NB | Comamonas | acidovorans |
| 6HB | Comamonas | acidovorans |
| 6NB | Comamonas | acidovorans |
| 4EB | Acidovorax | delafieldii |
| 4NB | Acidovorax | delafieldii |
| 6NB | Acidovorax | delafieldii |
| 4NB | Rhodococcus | rhodochrous |
| 7NB | Rhodococcus | rhodochrous |
| 2EB | Rhodococcus | erythropolis |
| 3EB | Rhodococcus | erythropolis |
| 6HB | Rhodococcus | erythropolis |
| 4EB* | Rhodococcus | fascians |
| 5EB* | Rhodococcus | fascians |
| 4NB | Aureobacterium | barkeri |
| 4HB | Aureobacterium | esteroaromaticum |
| 4NB | Aureobacterium | esteroaromaticum |
| 6HB | Aureobacterium | saperdae |
| 5EB | Micrococcus | varians |
| 7NB | Micrococcus | varians |
| 7NB | Micrococcus | kirstinae |
| 6HB | Aeromonas | caviae |
| 6NB | Aeromonas | caviae |
| 2EB | Stenotrophomonas | maltophilia |
| 3EB | Stenotrophomonas | maltophilia |
| 4BB | Stenotrophomonas | maltophilia |
| 5EB | Stenotrophomonas | maltophilia |
| 6HB | Stenotrophomonas | maltophilia |
| 6NB | Stenotrophomonas | maltophilia |
| 4EB | Sphingobacterium | thalpophilum |
| 4NB* | Sphingobacterium | spiritivorum |
| 4NB | Shewanella | putrefaciens B |
| 3NB* | Phyllobacterium | myrsinacearum |
| 6HB | Clavibacter | michiganense |
| 6HB | Clavibacter | michiganense**** |
| 6NB | Alcaligenes | xylosoxydans |
| 7HB* | Gordona | terrae |
| 7NB | Corynebacterium | aquaticum B |
| 7NB | Cytophaga | johnsonae |

* = low similarity index indicating a poor match with the fatty-acid database. In these cases, the species in the consortia listed was matched to a database testing substrate utilization and remained unidentified. The (*) best describes an unknown genera/species.
** = GC Subgroup A subspecies
*** = GC Subgroup B subspecies
**** = tessellarius subspecies In-situ bioremedial processes that may be used in accordance with the present invention include the injection of non-indigenous butane-utilizing microorganisms into the surface or subsurface and/or the use of indigenous butane-utilizing microorganisms. Indigenous microorganisms can be stimulated to flourish by the addition of nutrients and a growth substrate that may be limited in the ecosystem under scrutiny. For aerobic metabolism, oxygen is usually in limited concentrations. The growth of butane-utilizing bacteria may be enhanced through the addition of butane, oxygen and, optionally, supplemental nutrients in any subsurface environment in which chlorohydrocarbons have been introduced, thereby creating an effective treatment zone. Oxygen, nutrients such as inorganic and organic nitrogen-containing and phosphorous-containing compounds and butane gas can be delivered into the subsurface through injection or diffusion wells or some other type of delivery system. Alternatively, non-indigenous strains of butane-utilizing organisms may be injected into a subsurface environment. For petroleum-utilizing bacteria, the introduction of the aliphatic hydrocarbon carbon source may not be necessary. The butane-utilizing organisms of the present invention may be applied in-situ in saline or low pH environments as well.

A preferred system and method of in-situ bioremediation which may be used to degrade petroleum pollutants are described in U.S. Patent Application entitled "System and Method of In-Situ Bioremediation with Butane-Utilizing Bacteria" filed Mar. 24, 1999, which is incorporated herein by reference.

Furthermore, butane-utilizing organisms of the present invention may be provided in an ex-situ bioreactor as described in U.S. patent application Ser. No. 08/767,750 capable of treating air, soil or groundwater (freshwater, saline or low pH) waste streams. The ex-situ bioreactor may be used in a batch-type process and/or in a continuous flow process.

For air or gas treatment, butane-utilizing bacteria may be grown in a bioreactor on any suitable type of packing material or substrate capable of withstanding turbulent gas streams. The gas stream laden with chlorinated volatile organic compounds may be extracted from the subsurface or other environment with a vacuum blower and treated in a bioreactor. In this embodiment, treatment consists of passing the chlorinated air waste stream through the bioreactor in much the same fashion as conventional activated carbon systems, with the exception that the contaminants are not merely transferred but destroyed.

Petroleum-impacted soils may be bioremediated in accordance with the present invention with butane-utilizing organisms in an ex-situ bioreactor. This apparatus may agitate soil through mixing or fluidizing, thereby accelerating the volatilization of petroleum which could be treated as an air waste stream described above. Another type of soil reactor may degrade petroleum pollutants in a bioreactor capable of treating a soil slurry matrix through either the introduction of non-indigenous butane-utilizing bacteria, or the stimulation of indigenous butane-utilizing bacteria. Oxygen, nutrients including alternate limited carbon and nitrogen sources such as casamino acids and yeast and butane may be introduced into this type of bioreactor. The use of surfactants may accelerate the removal of the petroleum pollutants from the soil matrix thereby lower treatment time and increasing bioreactor performance.

In accordance with an embodiment of the present invention, an ex-situ bioreactor may be used to restore surface water or groundwater impacted with petroleum pollutants, by employing butane-utilizing bacteria. The impacted water may comprise fresh water, salt water, low pH water or the like. The ex-situ bioreactor may comprise one or multiple chambers, each housing a substrate such as biofilm fabric or packing material seeded with specific strains or a consortia of butane-utilizing bacteria. Each bioreactor chamber preferably comprises an oxygen, nutrient and butane gas delivery system. Bioreactor systems employing butane-utilizing organisms that demonstrate the ability to use petroleum compounds as a direct food source may not require the introduction of butane. However, in a cometabolic system, timers are preferably included to regulate the introduction of the butane, thereby reducing the likelihood of saturating the enzyme sites which would result in a lower contaminant destruction rate.

In addition to batch-type processes, the bioreactors may also operate by continuous flow techniques. Petroleum removal efficiency may be increased substantially by controlling process parameters such as increasing biofilm surface area with the medium, improving butane and oxygen delivery systems and adjusting adequate conditions for optimum bacterial growth. Various other support media, i.e., non-metallic screens, pellets, beads, etc., for the biofilm in the bioreactors listed above may provide a larger surface area for biofilm formation prior to the treatment phase. Other types of support media may also optimize bacterial growth and surface to volume ratio in the bioreactor thus improving biodegradation conditions, and effectively reducing the required residence times within the bioreactor. Greater performance may be achieved by utilizing effective oxygen and growth substrate delivery systems such as sparging. This can be accomplished by reducing bubble size during sparging which would increase the availability of the compounds to the microorganism inside the bioreactor. In certain cases, it may be desirable to reduce the negative effects of extremely stressed influent streams to the bioreactor by pre-adjusting pH, temperature and other related physico-chemical parameters.

Whereas particular embodiments of this invention have been described above for purposes of illustration, it will be evident to those skilled in the art that numerous variations of the details of the present invention may be made without departing from the invention as defined in the appended claims.

What is claimed is:

1. A method of degrading a petroleum pollutant comprising at least one compound contained in crude or refined petroleum, the method comprising treating the petroleum pollutant with butane-utilizing bacteria in the presence of a butane substrate and oxygen for a treatment time sufficient for the butane-utilizing bacteria to degrade the petroleum pollutant.

2. The method of claim 1, wherein the butane substrate comprises butane as the most prevalent compound of the substrate.

3. The method of claim 1, wherein the butane substrate comprises at least about 10 weight percent butane.

4. The method of claim 1, wherein the butane substrate comprises at least about 50 weight percent butane.

5. The method of claim 1, wherein the butane substrate comprises at least about 90 weight percent butane.

6. The method of claim 1, wherein the butane substrate comprises at least about 99 weight percent n-butane.

7. The method of claim 1, wherein the butane is provided at a substantially constant rate.

8. The method of claim 1, wherein the butane is provided for substantially the entire treatment time.

9. The method of claim 1, further comprising providing the at least one butane to the butane-utilizing bacteria during a portion of the treatment time.

10. The method of claim 1, wherein the butane is provided in pulses.

11. The method of claim 1, wherein the oxygen is provided to the butane-utilizing bacteria for substantially the entire treatment time.

12. The method of claim 1, wherein the oxygen is provided as air.

13. The method of claim 1, wherein the oxygen is provided at a substantially constant rate.

14. The method of claim 1, wherein the butane-utilizing bacteria comprises at least one bacterium selected from the group consisting of Pseudomonas, Variovorax, Nocardia, Chryseobacterium, Comamonas, Acidovorax, Rhodococcus, Aureobacterium, Micrococcus, Aeromonas, Stenotrophomonas, Sphingobacterium, Shewanella, Phyllobacterium, Clavibacter, Alcaligenes, Gordona, Corynebacterium and Cytophaga.

15. The method of claim 1, wherein the butane-utilizing bacteria comprises at least one bacterium selected from the group consisting of *putida, rubrisubalbicans, aeruginosa, paradoxus, asteroides, brasiliensis, restricta, globerula, indologenes, meningosepticum, acidovorans, delafieldii, rhodochrous, erythropolis, fascians, barkeri, esteroaromaticum, saperdae, varians, kristinae, caviae, maltophilia, thalpophilum, spiritivorum, putrefaciens B, myrsinacearum, michiganense, xylosoxydans, terrae, aquaticum B* and *johnsonae*.

16. The method of claim 1, wherein the butane-utilizing bacteria comprises at least one bacterium selected from the group consisting of *Pseudomonas rubrisubalbicans, Pseudomonas aeruginosa, Variovorax paradoxus, Nocardia asteroides, Nocardia restricta, Chryseobacterium indologenes, Comamonas acidovorans, Acidovorax delafieldii, Rhodococcus rhodochrous, Rhodococcus erytlropolis, Aureobacterium esteroaromaticum, Aureobacterium saperdae, Micrococcus varians, Micrococcus kristinae, Aeromonas caviae, Stenotrophomonas maltophilia, Sphingobacterium thalpophilum, Clavibacter michiganense, Alcaligenes xylosoxydans, Corynebacterium aquaticum B* and *Cytophaga johnsonae*.

17. The method of claim 1, wherein the petroleum pollutant is present within soil.

18. The method of claim 17, wherein the concentration of the petroleum pollutant within the soil is less than about 200 ppm total petroleum hydrocarbons after the treatment with the butane-utilizing bacteria.

19. The method of claim 1, wherein the petroleum pollutant is present in a liquid.

20. The method of claim 19, wherein the liquid comprises water.

21. The method of claim 20, wherein the concentration of the petroleum pollutant in the water is less than about 0.2 ppm total petroleum hydrocarbons after the treatment with the butane-utilizing bacteria.

22. The method of claim 20, wherein substantially all of the petroleum is degraded by the butane-utilizing bacteria.

23. The method of claim 1, wherein the petroleum pollutant is treated in-situ at a contaminated site.

24. The method of claim 23, wherein the contaminated site comprises groundwater.

25. The method of claim 1, wherein the petroleum pollutant is treated ex-situ in a bioreactor.

26. The method of claim 1, wherein the at least one compound contained in crude or refined petroleum comprises at least one C5–C36 aliphatic or C9–C22 aromatic compound.

27. The method of claim 1, wherein the at least one compound contained in crude or refined petroleum comprises at least one polycyclic aromatic hydrocarbon.

28. The method of claim 1, wherein the at least one compound contained in crude or refined petroleum comprises at least one compound selected from trimethylbenzenes, naphthalene, anthracene, acenaphthene, acenaphthylene, benzo(a)anthracene, benzo(a)pyrene, benzo(b)fluoranthene, benzo(g,h,i)perylene, benzo(k)fluoranthene and pyrene.

29. A method of decontaminating water comprising:
providing contaminated water comprising a petroleum pollutant including at least one compound contained in crude or refined petroleum; and
treating the petroleum pollutant with an butane-utilizing bacteria in the presence of a butane substrate and oxygen for a treatment time sufficient for the butane-utilizing bacteria to degrade the petroleum pollutant to produce decontaminated water having a lower concentration of the petroleum pollutant than the contaminated water.

30. The method of claim 29, wherein the butane substrate comprises butane as the most prevalent compound of the substrate.

31. The method of claim 29, wherein the butane substrate comprises at least about 10 weight percent butane.

32. The method of claim 29, wherein the butane substrate comprises at least about 50 weight percent butane.

33. The method of claim 29, wherein the butane substrate comprises at least about 90 weight percent butane.

34. The method of claim 29, wherein the butane is provided as a butane substrate comprises at least about 99 weight percent n-butane.

35. The method of claim 29, wherein the decontaminated water comprises less than about 0.2 parts per million total petroleum hydrocarbons.

36. The method of claim 29, wherein the contaminated water comprises groundwater.

37. The method of claim 29, wherein the contaminated water is treated in-situ at a contaminated site.

38. The method of claim 29, wherein the contaminated water is treated ex-situ in a bioreactor.

39. The method of claim 29, wherein the at least one compound contained in crude or refined petroleum comprises at least one C5–C36 aliphatic or C9–C22 aromatic compound.

40. The method of claim 29, wherein the at least one compound contained in crude or refined petroleum comprises at least one polycyclic aromatic hydrocarbon.

41. The method of claim 29, wherein the at least one compound contained in crude or refined petroleum comprises at least one compound selected from trimethylbenzenes, naphthalene, anthracene, acenaphthene, acenaphthylene, benzo(a)anthracene, benzo(a)pyrene, benzo(b)fluoranthene, benzo(g,h,i)perylene, benzo(k)fluoranthene and pyrene.

42. A method of treating a site contaminated with petroleum pollutants including at least one compound contained in crude or refined petroleum, the method comprising:
supplying a butane substrate to the contaminated site to stimulate butane-utilizing bacteria; and
supplying oxygen-containing gas to the contaminated site.

43. The method of claim 42, wherein the butane substrate comprises at least about 10 weight percent butane.

44. The method of claim 42, wherein the butane substrate comprises at least about 50 weight percent butane.

45. The method of claim 42, wherein the butane substrate comprises at least about 90 weight percent butane.

46. The method of claim 42, wherein the butane substrate comprises at least about 99 weight percent n-butane.

47. The method of claim 42, wherein the at least one compound contained in crude or refined petroleum comprises at least one C5–C36 aliphatic or C9–C22 aromatic compound.

48. The method of claim 42, wherein the at least one compound contained in crude or refined petroleum comprises at least one polycyclic aromatic hydrocarbon.

49. The method of claim 42, wherein the at least one compound contained in crude or refined petroleum comprises at least one compound selected from trimethylbenzenes, naphthalene, anthracene, acenaphthene, acenaphthylene, benzo(a)anthracene, benzo(a)pyrene, benzo(b)fluoranthene, benzo(g,h,i)perylene, benzo(k)fluoranthene and pyrene.

50. The method of claim 42, wherein the contaminated site comprises soil.

51. The method of claim 42, wherein the contaminated site comprises groundwater.

52. An in-situ method of decontaminating soil containing a petroleum pollutant including at least one compound contained in crude or refined petroleum, the method comprising injecting a butane substrate and oxygen into the soil to thereby stimulate growth of butane-utilizing bacteria which degrade the at least one compound contained in crude or refined petroleum.

53. The method of claim 52, wherein the butane substrate comprises butane as the most prevalent compound of the substrate.

54. The method of claim 52, wherein the butane substrate comprises at least about 10 weight percent butane.

55. The method of claim 52, wherein the butane substrate comprises at least about 50 weight percent butane.

56. The method of claim 52, wherein the butane substrate comprises at least about 90 weight percent butane.

57. The method of claim 52, wherein the butane substrate comprises at least about 99 weight percent n-butane.

58. The method of claim 52, wherein the butane is provided in pulses.

59. The method of claim 52, wherein the oxygen is provided as air.

60. The method of claim 52, wherein the concentration of the petroleum pollutant within the soil is less than about 200 ppm total petroleum hydrocarbons after the treatment with the butane-utilizing bacteria.

61. The method of claim 52, wherein the at least one compound contained in crude or refined petroleum comprises at least one C5–C36 aliphatic or C9–C22 aromatic compound.

62. The method of claim 52, wherein the at least one compound contained in crude or refined petroleum comprises at least one polycyclic aromatic hydrocarbon.

63. The method of claim 52, wherein the at least one compound contained in crude or refined petroleum comprises at least one compound selected from trimethylbenzenes, naphthalene, anthracene, acenaphthene, acenaphthylene, benzo(a)anthracene, benzo(a)pyrene, benzo(b)fluoranthene, benzo(g,h,i)perylene, benzo(k)fluoranthene and pyrene.

* * * * *

UNITED STATES PATENT AND TRADEMARK OFFICE
CERTIFICATE OF CORRECTION

PATENT NO. : 6,110,372
APPLICATION NO. : 09/275381
DATED : August 29, 2000
INVENTOR(S) : Felix Anthony Perriello It is certified that error appears in the above-identified patent and that said Letters Patent is hereby corrected as shown below:

Title Page Item (56):
Add the Following Publications:

Semprini et al., Comparison Between Model Simulations and Field Results for In-Situ Biorestoration of Chlorinated Aliphatics: Part 1. Biostimulation of Methanotrophic Bacteria, *Ground Water,* Vol. 29, No. 3, pp. 365-374 (May-June 1991).

Hartmans et al., Aerobic Vinyl Chloride Metabolism in *Mycobacterium aurum* L1, *Applied and Environmental Microbiology,* Vol. 58, No. 4, pp. 1220-1226 (April 1992).

Hopkins et al., Microcosm and In Situ Field Studies of Enhanced Biotransformation of Trichloroethylene by Phenol-Utilizing Microorganisms, *Applied and Environmental Microbiology,* Vol. 59, No. 7, pp. 2277-2285 (July1993).

Norris et al., Section 6 – Bioventing of Chlorinated Solvents for Ground-Water Cleanup Through Bioremediation, *in-Situ Bioremediation of Ground Water and Geological Material: A Review of Technologies,* U.S. Environmental Protection Agency (July 1993).

Fogel et al., Biodegradation of Chlorinated Ethenes by a Methane-Utilizing Mixed Culture, *Applied and Environmental Microbiology,* Vol. 51, No. 4, pp. 720-724 (April 1986).

Wackett et al., Survey of Microbial Oxygenases: Trichioroethylene Degradation by Propane-Oxidizing Bacteria, *Applied and Environmental Microbiology,* Vol. 55, No. 11, pp. 2960-2964 (November 1989).

Fox, Status and Trends in Bioremediation Treatment Technology, *Remediation,* pp. 293-303 (Summer 1991).

Alvarez-Cohen et al., Characterization of a Methane-Utilizing Bacterium from a Bacterial Consortium, That Rapidly Degrades Trichloroethylene and Chloro form, *Applied and Environmental MIcrobiololy),* Vol. 58, No. 6, pp. 1886-1893 (June 1992).

Chang et al., Transformation Capacities of Chlorinated Organics by Mixed Cultures Enriched on Methane, Propane, Toluene, or Phenol, *Biotechnology and Bioengineering,* Vol. 45, pp. 440-449 (November 9, 1994).

Page 1 of 2

UNITED STATES PATENT AND TRADEMARK OFFICE
CERTIFICATE OF CORRECTION

PATENT NO.       : 6,110,372
APPLICATION NO.  : 09/275381
DATED            : August 29, 2000
INVENTOR(S)      : Felix Anthony Perriello It is certified that error appears in the above-identified patent and that said Letters Patent is hereby corrected as shown below:

Title Page Item (56):
Add the Following Publications:

Kim et al., Aerobic Cometabolism of Chloroform and 1,1,1 -Trichloroethane by Butane-Grown Microorganisms, *Bioremediation Journal,* Vol. 1, No. 2, pp. 135-148 (1997).

Hamamura et al., Chloroform Cometabolism by Butane-Grown CF8, *Pseudomonas butanovora,* and *Mycobacterium vaccae* JOB5 and Methane-Grown *Methylosinus trichosporium* OB3b, *Applied and Environmental Microbiology,* Vol. 63, No. 9, pp. 3607-3613 (September 1997).

Steffan et al., Biodegradation of the Gasoline Oxygenates Methyl *tert*-Butyl Ether, Ethyl *tert*-Butyl Ether, and *tert*-Amyl Methyl Ether by Propane-Oxidizing Bacteria, *Applied and Environmental Microbiology,* Vol. 63, No. 11, pp. 4216-4222 (November 1997).

Column 12,
Table 12, Line 56, "4BB" should read --4EB--.

Column 16, Lines 28-29 (Claim 34), delete "butane is provided as a".

Signed and Sealed this

Fourteenth Day of November, 2006

JON W. DUDAS
*Director of the United States Patent and Trademark Office*